United States Patent
Tamura

(10) Patent No.: US 9,893,583 B2
(45) Date of Patent: Feb. 13, 2018

(54) STATOR FOR ROTATING ELECTRIC MACHINE

(71) Applicant: DENSO CORPORATION, Kariya, Aichi-pref. (JP)

(72) Inventor: Akito Tamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/590,071

(22) Filed: May 9, 2017

(65) Prior Publication Data

US 2017/0244295 A1 Aug. 24, 2017

Related U.S. Application Data

(62) Division of application No. 14/615,515, filed on Feb. 6, 2015, now Pat. No. 9,680,345.

(30) Foreign Application Priority Data

Feb. 7, 2014 (JP) .................. 2014-022643

(51) Int. Cl.
*H02K 3/04* (2006.01)
*H02K 3/34* (2006.01)
*H02K 3/30* (2006.01)

(52) U.S. Cl.
CPC .................. *H02K 3/34* (2013.01); *H02K 3/30* (2013.01)

(58) Field of Classification Search
CPC ............. H02K 3/30; H02K 3/524; H02K 1/04
USPC ................... 310/179–180, 194, 45, 201–208
See application file for complete search history.

(56) References Cited

U.S. PATENT DOCUMENTS

| 3,805,104 | A | 4/1974 | Margrain |
| 6,191,510 | B1 | 2/2001 | Landin |
| 6,204,586 | B1 * | 3/2001 | Umeda ..................... H02K 3/12 310/179 |
| 6,404,091 | B1 | 6/2002 | Nakamura |
| 2001/0040416 | A1 | 11/2001 | Nakamura et al. |
| 2012/0293034 | A1 | 11/2012 | Stabenow |
| 2014/0015348 | A1 * | 1/2014 | Li ........................... H02K 3/12 310/43 |
| 2014/0184012 | A1 | 7/2014 | Seguchi |
| 2015/0229176 | A1 | 8/2015 | Tamura |

FOREIGN PATENT DOCUMENTS

JP 2001-169490 6/2001

\* cited by examiner

*Primary Examiner* — Thanh Lam
(74) *Attorney, Agent, or Firm* — Nixon & Vanderhye P.C.

(57) ABSTRACT

A stator for a rotating electric machine, including an annular stator core having a plurality of slots circumferentially arranged in the stator core, and a stator winding wound around the stator core and comprised of a plurality of U-shaped conductor segments inserted in the slots and connected to each other. Each conductor segment includes a conductor and a bilayer insulative coating comprised of an insulating layer covering a peripheral surface of the conductor and a protective layer covering a peripheral surface of the insulating layer. The protective layer is formed of a material having a Young's modulus that is equal to or greater than a Young's modulus of the insulating layer at room temperature and less than the Young's modulus of the insulating layer in high temperature environments caused by heat generation of the stator winding.

5 Claims, 7 Drawing Sheets

STATOR FOR ROTATING ELECTRIC MACHINE

CROSS-REFERENCE TO RELATED APPLICATION

This is a divisional of U.S. application Ser. No. 14/615,515, filed Feb. 6, 2015, which is based on and claims the benefit of priority from earlier Japanese Patent Application No. 2014-22643 filed Feb. 7, 2014, the descriptions of each of which are incorporated herein by reference.

BACKGROUND

Technical Field

The present invention relates to a stator for a rotating electric machine mounted in a vehicle or the like and used as an electrical motor or an alternator.

Related Art

A rotating electric machine to be mounted in a vehicle is well-known that includes a rotor, a stator core having a plurality of slots radially opposing the rotor and arranged in a circumferential direction of the core, and a stator having a stator winding wound in the slots of the stator core.

A known stator winding wound around the stator core, as disclosed in Japanese Patent No. 4450125, is a segmented stator winding formed by connecting terminals of a plurality of U-shaped conductor segments. Such a stator winding is formed by inserting a pair of straight portions of each U-shaped conductor segment into different slots from one of axial ends of the stator core, bending a pair of open end portions of the conductor segment protruding from the other axial end of the stator core in opposite circumferential directions to form a pair of angled portions, and then joining, e.g., welding, the angled portions of different conductor segments together to form a joined connection. Each U-shaped conductor segment includes a conductor and an insulative coating covering a peripheral surface of the conductor.

When, as above, the open end portions of each U-shaped conductor segment protruding from the other axial end of the stator core are bent in opposite circumferential directions with predetermined (constant) pressure to form the angled portions of the U-shaped conductor segment of the segmented stator winding, the U-shaped conductor segment will become in contact with corners where an axial end face of the stator core and inner walls of slots in which the U-shaped conductor segment is inserted meet. The insulative coating covering the peripheral surface of the conductor segment is prone to be damaged or collapsed, which may lead to insulation failure of the stator winding.

In addition, the stator winding produces heat through energization to become hot. Elevated temperature of the stator winding may cause the insulative coating of each U-shaped conductor segment to thermally expand. The insulative coatings of slot-received portions of the U-shaped conductor segment are prone to be damaged or collapsed within the slots of the stator core under stress due to a difference in the coefficient of thermal expansion between the insulative coating and the conductor of the U-shaped conductor segment. This also leads to insulation failure of the stator winding.

In consideration of the foregoing, exemplary embodiments of the present invention are directed to providing a stator for a rotating electric machine capable of preventing insulation failure of a stator winding from occurring during bending of conductor segments to form the stator winding or in high temperature environments, thereby ensuring good insulating properties.

SUMMARY

In accordance with an exemplary embodiment of the present invention, there is provided a stator for a rotating electric machine, including an annular stator core having a plurality of slots circumferentially arranged in the stator core, and a stator winding wound around the stator core and comprised of a plurality of U-shaped conductor segments. Each of the conductor segments includes a pair of slot-received portions inserted in different slots and a pair of circumferentially angled portions integrally connected with the respective slot-received portions and extending outside of the different slots. Prescribed angled portions of different conductor segments are joined at their junction end portions to form the stator winding.

The stator is configured such that each of the plurality of conductor segments includes a conductor and a bilayer insulative coating comprised of an insulating layer covering a peripheral surface of the conductor and a protective layer covering a peripheral surface of the insulating layer. The protective layer is formed of a material having a Young's modulus that is equal to or greater than a Young's modulus of the insulating layer at room temperature and less than the Young's modulus of the insulating layer in high temperature environments caused by heat generation of the stator winding. In the embodiment set forth above, room temperature may be defined as a temperature within a range of 20±15 degrees C. (i.e., 5-35 degrees C.) in conformity to the Japanese Industrial Standards (JIS). The high temperature environments are environments caused by heat generation through energization of the stator winding during operation of the rotating electric machine can vary according to specifications of the stator or the rotating electric machine and may be defined as a temperature within a range of about 160-200 degrees C.

In the embodiment set forth above, each of the plurality of conductor segments includes a conductor and a bilayer insulative coating comprised of an insulating layer covering a peripheral surface of the conductor and a protective layer covering a peripheral surface of the insulating layer. The protective layer is formed of a material having a Young's modulus that is equal to or greater than a young's modulus of the insulating layer at room temperature and less than the young's modulus of the insulating layer in high temperature environments.

That is, the Young's modulus of the protective layer of the insulative coating is set equal to or greater than the Young's modulus of the insulating layer at room temperature. With this configuration, even when the conductor segment is in contact with corners where an axial end face of the stator core from which open end portions axially project and inner walls of the slots through which the slot-received portions of the conductor segment are inserted meet while bending the open end portions of the conductor segment to form the angled portions in room temperature environments, the corners can be prevented from biting into the insulating layer while the corners are allowed to bite into the protective layer having the Young's modulus greater than the insulating layer. This can prevent the insulating layer from being damaged and collapsed, thereby preventing the insulation failure.

In addition, the Young's modulus of the protective layer of the insulative coating is set less than the Young's modulus of the insulating layer of the insulative coating in high temperature environments caused by heat generation of the stator winding through energization thereof during operation. With this configuration, under stress exerted on the insulative coating during thermal expansion of the insulative coating and the conductor within each slot in the high temperature environments such that the insulative coating is compressed between the conductor and the stator core within the slot and at least one dimension (e.g., thickness) of the insulative coating is thus reduced by a predetermined dimension reduction through sizing deformation, the protective layer collapses, thereby releasing the stress exerted on the insulative coating. This can prevent damage to or collapse of the insulation layer, thereby preventing the insulation failure.

DESCRIPTION OF SPECIFIC EMBODIMENTS

Example embodiments will now be described more fully with reference to the accompanying drawings. Example embodiments are provided so that this disclosure will be thorough, and will fully convey the scope to those who are skilled in the art. Numerous specific details are set forth such as examples of specific components to provide a thorough understanding of embodiments of the present disclosure. It will be apparent to those skilled in the art that example embodiments may be embodied in many different forms and that neither should be construed to limit the scope of the disclosure.

First Embodiment

Figure 1:
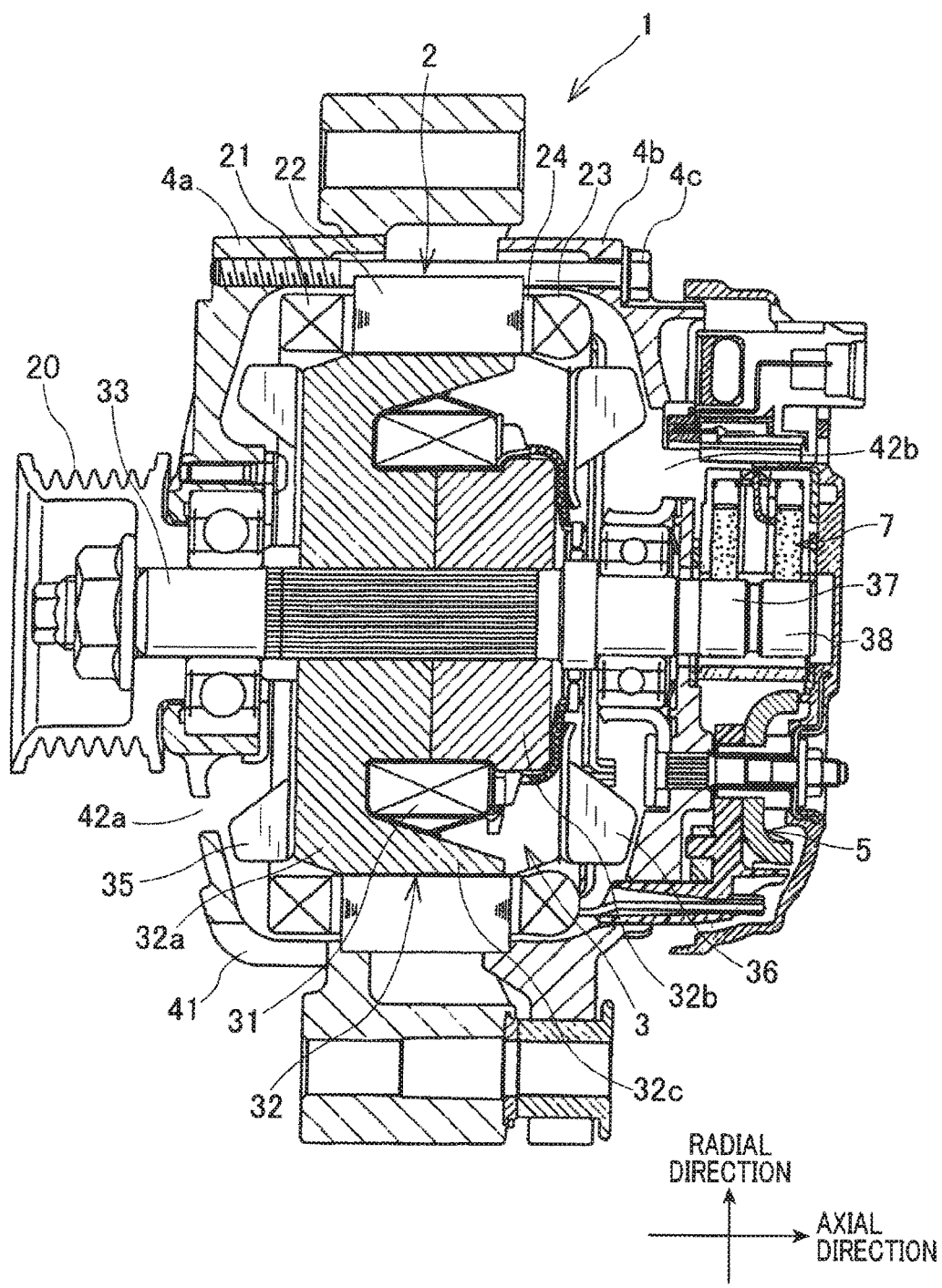
FIG. 1 is an axial sectional view of a rotating electric machine in accordance with a first embodiment of the present invention.

A rotating electric machine 1 of the present embodiment may be used as a vehicle alternator. As shown in FIG. 1, the rotating electric machine 1 includes a stator 2 configured to act as an armature, a rotor 3 configured to act as a field, a front housing 4a and a rear housing 4b that are connected and secured to each other with a securing bolt 4c to enclose the stator 2 and the rotor 3, a commutator 5 configured to convert alternating-current (AC) power into direct-current (DC) power, and others.

Figure 2:
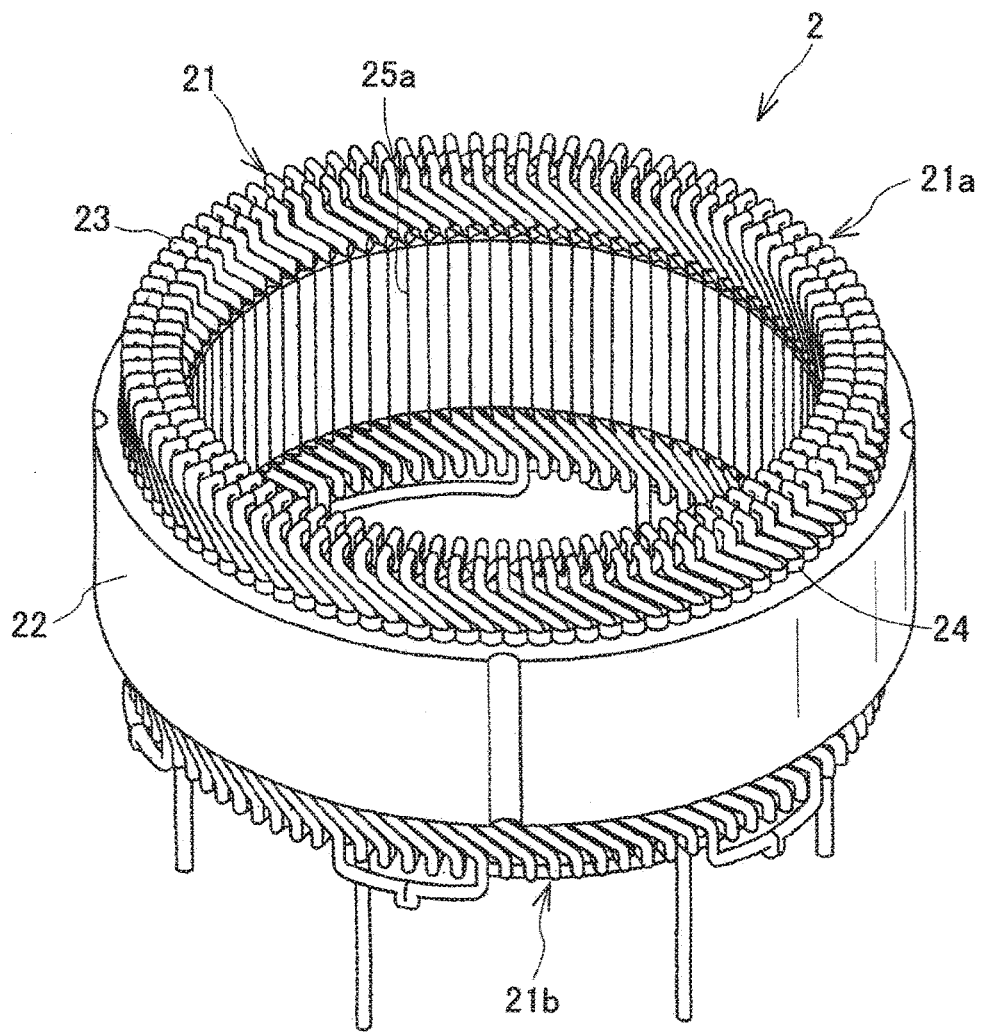
FIG. 2 is a schematic perspective view of a stator in accordance with the first embodiment.

The stator 2, as shown in FIG. 2, includes a stator core 22, a segmented stator winding 21 formed of a plurality of conductor segments 23, and an insulating sheet member 24 for electrically isolating the stator winding 21 from the stator core 22. The stator 2 is sandwiched and secured between a front housing 4a and a rear housing 4b and arranged around and in spaced relationship with the outer periphery of the rotor 3 with a predetermined air gap G between the stator 2 and the rotor 3 (see FIG. 11). A detailed structure of the stator 2 will be described later.

Referring to FIG. 1, the rotor 3 is configured to rotate in unison with a shaft 33 rotatably supported by the front housing 4a and the rear housing 4b and includes a Lundell pole core 32 and a field winding 31. A pulley 20 is secured to the front end of the shaft 33 connected to a vehicle-mounted engine (not shown) via a belt or the like.

The Lundell pole core 32 is formed of a pair of front and rear pole cores 32a, 32b. The pole cores 32a, 32b each include six claw-shaped magnetic pole portions 32c and are both slipped onto the shaft 33 so as to cramp the field winding 31 on both sides thereof with these claw-shaped magnetic pole portions 32c. The field winding 31 is an insulated copper winding wound concentrically and cylindrically shaped. In the present embodiment, the pole cores 32a, 32b are provided with eight poles, thereby forming a 16-pole rotor 3.

An axial end face (front end face) of the front housing 4a and an axial end face (rear end face) of the rear housing 4b respectively have inlets 42a, 42b for taking in cooling air. A diagonal flow fan 35 is secured (e.g., welded) to a front end face of the pole core 32a for radially and axially discharging the cooling air taken in via the inlet 42a. A centrifugal fan 36 is secured (e.g., welded) to a rear end face of the pole core 32b for radially discharging the cooling air taken in via the inlet 42b. The front housing 4a and the rear housing 4b have their respective outlets 41 for discharging the cooling air facing coil end portions of the stator winding 21 projecting from both axial ends of the stator core 22.

At a rear end of the shaft 33 is provided with slip rings 37, 38 electrically connected to both ends of the field winding 31, via which electrical power is supplied from a brush device 7 to the field winding 31.

In operation of the vehicle alternator configured as above, upon receipt of rotational forces transmitted from the engine to the pulley 20 via the belt or the like, the rotor 3 rotates in unison with the shaft 33 in a predetermined direction. Application of an energization voltage from the brush device 7 to the field winding 31 of the rotor 3 via the slip rings 37, 38 during rotation of the rotor 3 activates each of claw-shaped magnetic pole portion 32c, which provides circumferentially alternating magnetic north- and south-poles in the rotational direction. This can induce a three-phase AC voltage across the stator winding 21, which allows a predetermined direct-current (DC) to be acquired from output terminals of the commutator 5.

Specific details of the stator 2 will now be described with reference to FIGS. 2 to 13. The stator core 22 is an axial stack of annular magnetic steel plates. The stator core 22 includes an annular back core 22a that is an outer periphery portion of the stator core 22, and a plurality of teeth 22b that project inward in a radial direction of the stator ore 22 from the back core 22a and are equally circumferentially spaced a predetermined distance apart from each other. The teeth 22b and the slots 25 are alternately arranged in the circumferential direction of the stator core 22 so as to receive the multi-phase stator winding 21 in the slots 25. In the present embodiment, as an example, the rotor 3 has sixteen magnetic poles of the rotor 3. Therefore, ninety-six slots 25 are equally circumferentially spaced from each other so as to receive two three-phase stator windings 2 in the slots 25.

Figure 3:
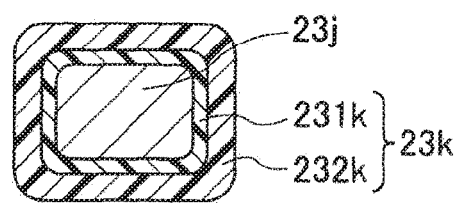
FIG. 3 is a cross-sectional view of a conductor segment in accordance with the first embodiment.
Figure 10:
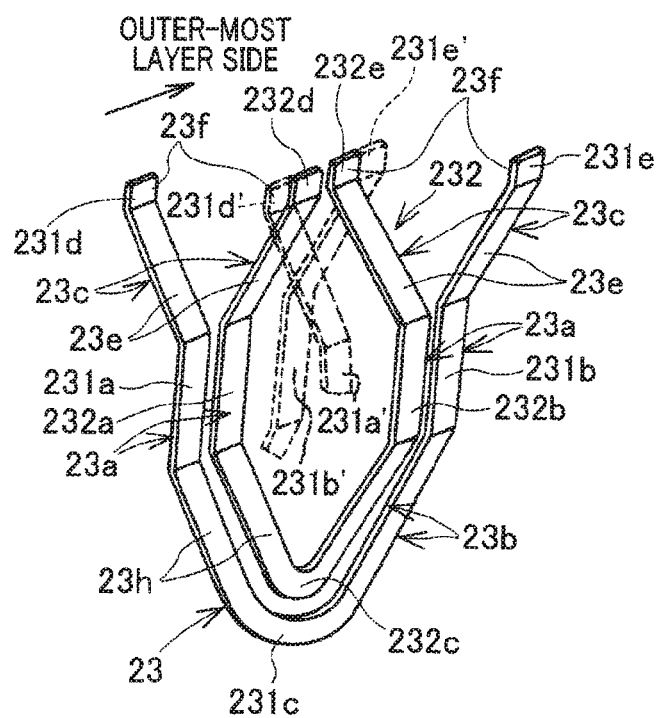
FIG. 10 is a schematic perspective view of conductor segments in accordance with the first embodiment.

The stator winding 21 received in the slots 25 of the stator core 22 are formed of a plurality of U-shaped conductor segments 23 joined at their junction end portions 23f (see FIG. 10). Each conductor segment 23, as shown in FIG. 3, is a rectangular wire with a rectangular cross section including a conductor 23j formed of a conductive metal material, such as copper or the like, and a bilayer insulative coating 23k covering a peripheral surface of the conductor 23j. At the junction end portions 23f of each U-shaped conductor segment 23, the conductor 23j is exposed with the insulative coating 23k stripped off. The junction end portions 23f of the different conductor segments 23 are joined in a predetermined pattern and then insulated.

The insulative coating 23k includes an insulating layer 231k, as an inner layer, covering the peripheral surface of the conductor 23j, and a protective layer 232k, as an outer layer, covering a peripheral surface of the insulating layer 231k. The insulating layer 231k is formed of enamel and has a thickness of about 30 μm. The protective layer 232k is formed of a resin, such as polyether ether ketone (PEEK) or the like, and has a thickness of about 100 μm. The protective layer 232k is formed of a material with the young's modulus equal to or greater than that of the insulating layer 231k at room temperature, but less than that of the insulating layer 231k in high temperature environments.

For each U-shaped conductor segment 23, the thickness of the protective layer 232k is set greater than a thickness reduction of the insulative coating 23k as open end portions of the U-shaped conductor segment 23 axially projecting from the slots 25 are bent in opposite circumferential directions to form angled portions 23e. This can prevent insulation failure of the stator winding 21 that may occur when the insulating layer 231k is broken during bending of the open end portions of the U-shaped conductor segment 23. In addition, for each U-shaped conductor segment 23, the thickness of the protective layer 232k is set greater than a thickness reduction of the insulative coating 23k of each slot received portion 23a within the slot 25 in high temperature environments. The protective layer 232k collapses (or becomes much thin) in high temperature environments during thermal expansion of the insulative coating 23k, thereby releasing stress exerted on the insulative coating 23k. This can prevent damage to or collapse of the insulating layer 231k, thereby preventing the insulation failure.

Figure 5:
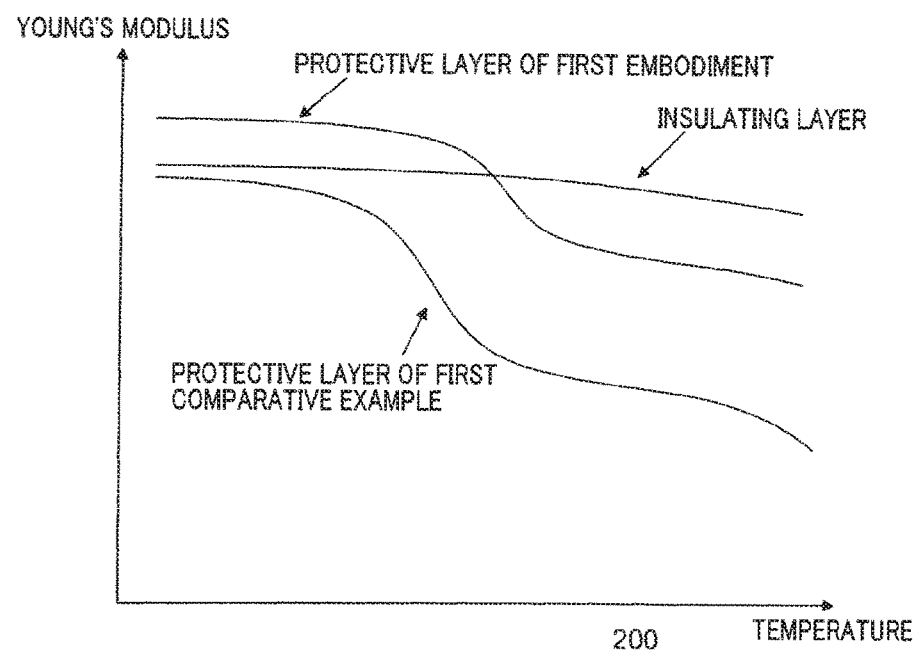
FIG. 5 is a graph of Young's modulus vs. environmental temperature for an insulating layer and a protective layer forming a insulative coating.

In the present embodiment, as shown in FIG. 5, the Young's modulus of the PEEK used in the protective layer 232k is equal to or greater than that of the insulating layer 231k within a temperature range including the room temperature (120 degrees C. or less) and less than that of the insulating layer 231k in high temperature environments (160 degrees C. or more). The Young's modulus of enamel forming the insulating layer 231k decreases smoothly as the temperature increases. The Young's modulus of enamel does not change as abruptly as the Young's modulus of the PEEK in any temperature range.

Figure 6:
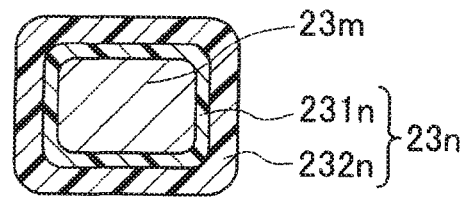
FIG. 6 is a cross-sectional view of a conductor segment in accordance with a first comparative example.

A conductor segment of a first comparative example as shown in FIG. 6 includes a conductor 23m formed of copper and a bilayer insulative coating 23n including an insulating layer 231n covering a peripheral surface of the conductor 23m and a protective layer 232n covering a peripheral surface of the insulating layer 231n. The insulating layer 231n is formed of enamel and has a thickness of about 30 μm as in the first embodiment. The protective layer 232n is formed of a resin, such as polyphenylene sulfide resin (PPS) or the like, and has a thickness of about 100 μm. In this first comparative example, as shown in FIG. 5, the Young's modulus of the PPS used in the protective layer 232n is less than that of the insulating layer 231n not only in the room temperature environments, but also in high temperature environments (200 degrees C. or more), in which the protective layer 232k of the present embodiment is remarkably different from the protective layer 232n of the first comparative example.

Figure 7:
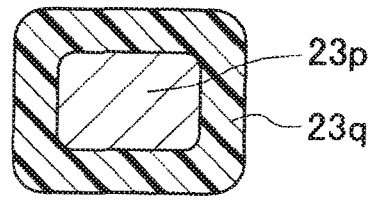
FIG. 7 is a cross-sectional view of a conductor segment in accordance with a second comparative example.
Figure 8A:
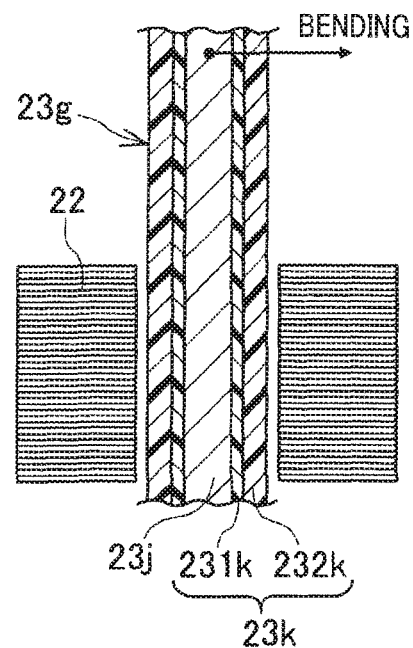
FIGS. 8A-8B are axial sectional views illustrating an example of bending open end portions of the conductor segment in accordance with the first embodiment.
Figure 8B:
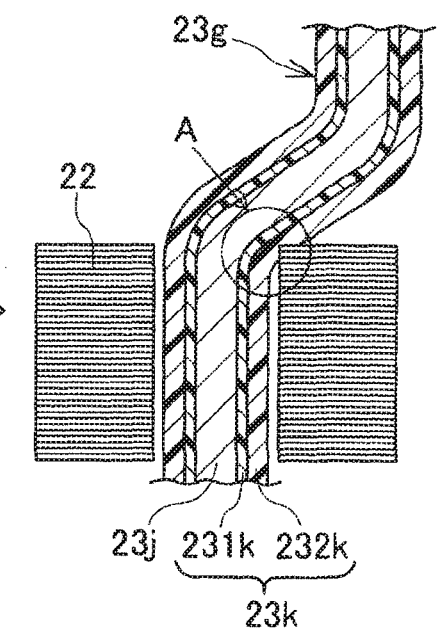
Figure 9A:
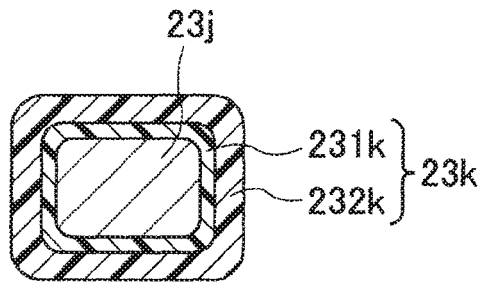
FIGS. 9A-9B are cross-sectional views illustrating an example of bending open end portions of the conductor segment in accordance with the first embodiment.
Figure 9B:
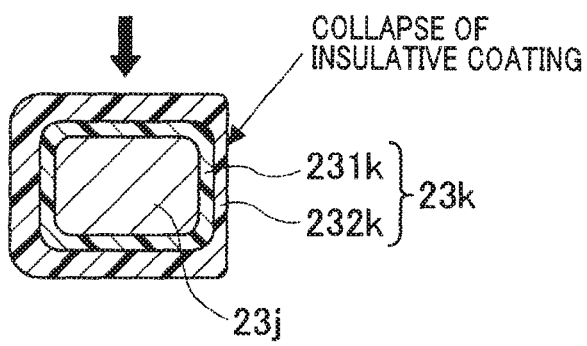

A traditional conductor segment of a second comparative example, as shown in FIG. 7, includes a conductor 23p formed of copper and a single-layer insulative coating 23q covering a peripheral surface of the conductor 23p. As in the first embodiment, the insulative coating 23q is formed of enamel and has a thickness of about 80 μm.

Figure 4:
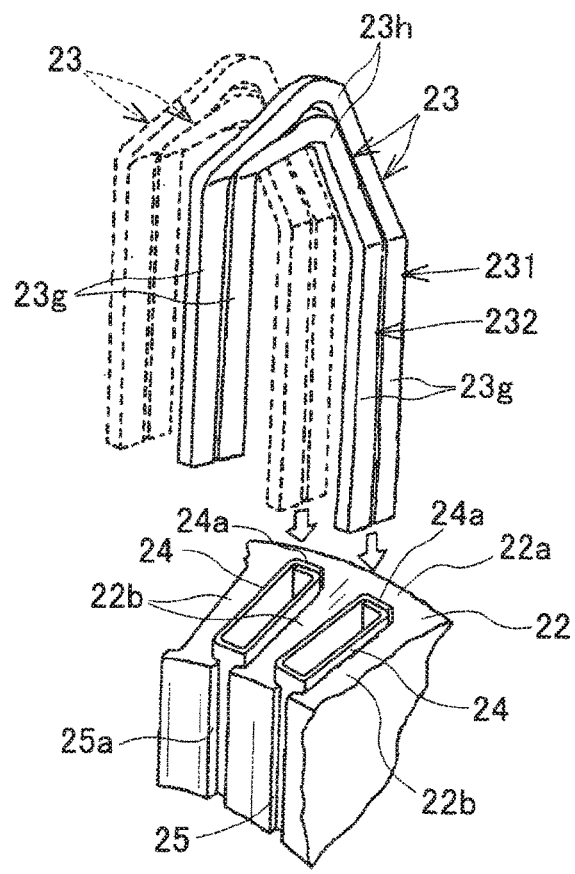
FIG. 4 is an example of inserting conductor segments into slots of a stator core in accordance with the first embodiment.

Referring to FIG. 4, each conductor segment 23 is U-shaped and includes a pair of straight portions 23g, 23g, and a turn portion 23h connecting the straight portions 23g, 23g at their respective ends. The pair of straight portions 23g, 23g of the conductor segment 23 are inserted into two slots 25 spaced a predetermined slot pitch apart from each other from one of axial ends of the stator core 22. Thereafter, open end portions of the straight portions 23g, 23g axially projecting from the other of axial ends of the stator core 22 are bent in opposite circumferential directions in room temperature environments.

That is, while bending the open end portions of the straight portions 23g, 23g of the U-shaped conductor segment, as shown in FIGS. 8A, 8B and FIGS. 9A, 9B, the U-shaped conductor segment 23 is in contact with corners where the axial end face of the stator core 22 from which the open end portions axially project and inner walls of the slots 25 through which the straight portions 23g, 23g of the U-shaped conductor segment are inserted meet (for example, at A portion shown in FIGS. 8B, and see also FIG. 9B) with the corners biting into the insulative coating 23k of the U-shaped conductor segment 23. For each U-shaped conductor segment 23, the Young's modulus of the protective layer 232k of the insulative coating 23k of the conductor segment 23 is set greater than that of the insulating layer 231k at room temperature, and the thickness of the protective layer 232k is set greater than a thickness reduction of the insulative coating 23k as the open end portions of the U-shaped conductor segment 23 are bent in opposite circumferential directions to form angled portions 23e, which can prevent the corners from biting into the insulating layer 231k while the corners are allowed to bite into the protective layer 232k having the Young's modulus greater than the insulating layer 231k. This can prevent the insulating layer 231k from being damaged and collapsed. Therefore, the insulation failure can be prevented.

Thus, as shown in FIG. 10, the conductor segment 23 includes a pair of lineally and axially extending slot-received portion 23a, 23a within the slots 25 and exposed coil end portions extending circumferentially from the slots 25. The coil end portions include a turn-side end portion 23b projecting from the slots 25 and from one of axial end sides (hereinafter referred to a first axial end side)of the stator core 22 (the rear side of the vehicle alternator 1 or the right hand side as viewed in FIG. 1) and connecting the slot-received portions 23a, 23a at their respective ends, and a pair of junction-side end portions 23c, 23c integrated with the respective slot-received portion 23a, 23a and projecting from the slots 25 and from the other of axial end sides (hereinafter referred to a second axial end side) of the stator core 22 (the front side of the vehicle alternator 1 or the left hand side as viewed in FIG. 1).

The turn-side end portion 23b includes, at its distal end, a turn portion 23h arranged in a generally V-shape through curved deformation. Each of the junction-side end portions 23c includes an angled portion 23e at a predetermined angle to the axial end face of the stator core 22 and a junction end portion 23f integrated with the angled portion 23e at its distal end t/hrough bending or flexing deformation.

Figure 11:
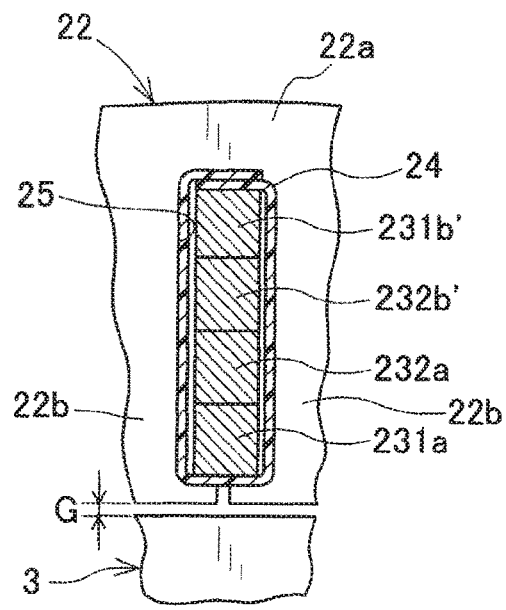
FIG. 11 is a partial cross-sectional view of the stator in accordance with the first embodiment.
Figure 12:
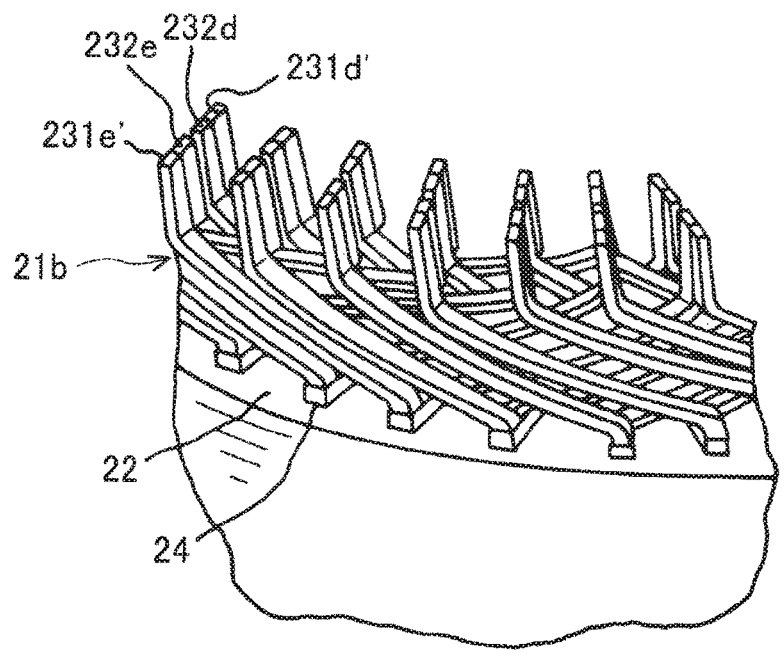
FIG. 12 is a partial perspective view of a junction-side end portion of the stator in accordance with the first embodiment.

Each slot 25 of the stator core 22 is configured to receive a predetermined even number (four in the present embodiment) of electrical conductors (the slot-received portions of different conductor segments), more specifically, a predetermined even number of slot-received portions 23a of different electrical conductors. In the present embodiment, as shown in FIG. 11, four electrical conductors are arranged in each slot 25 in the following radial order from the inside: an inner-most layer, an inner-middle layer, an outer-middle layer, an outer-most layer. The stator winding 21 of a specific one of phases may be formed by connecting the four electrical conductors received in one of the slots 25 in a predetermined connection pattern.

The electrical conductors in the slots 25 are electrically connected via the turn portions 23h of the turn-side end portions 23b on the first axial end side of the stator core 22. A number of turn portions 23h projecting from the slots 25 on the first axial end side of the stator core 22 form a first coil-end group 21a (see FIG. 2). The junction-side end portions 23c are electrically connected by arc welding the junction end portions 23f on the second axial end side of the stator core 22. A number of junction-side end portions 23c projecting from the slots 25 on the second axial end side of the stator core 22 form a second coil-end group 21b (see FIGS. 2, 12).

Figure 13:
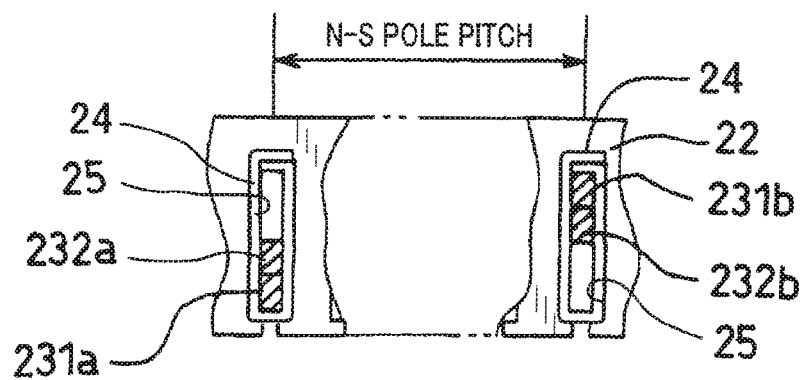
FIG. 13 is a partial cross-sectional view of slots in which conductor segments are to be inserted in accordance with the first embodiment.

One of the four electrical conductors in one of the slots 25 is paired with one of the four electrical conductors in another one of the slots 25 circumferentially spaced a predetermined pole pitch away from the one of the slots 25. For example, as shown in FIG. 13, the electrical conductor 231a received in the inner-most layer of one of the slots 25 is paired with the electrical conductor 231b received in the outer-most layer of another one of the slots 25 that is circumferentially spaced one pole pitch (N-S pole pitch) away from the one of the slots 25 in the clockwise direction of the stator core 22. Similarly, the electrical conductor 232a received in the inner-middle layer of one of the slots 25 is paired with the electrical conductor 232b received in the outer-middle layer of another one of the slots 25 that is circumferentially spaced one pole pitch (N-S pole pitch) away from the one of the slots 25 in the clockwise direction of the stator core 22.

Such a pair of electrical conductors are electrically connected via the turn portion 23h of the turn-side end portion 23b on the first axial end side of the stator core 22. More specifically, the electrical conductor 231a received in the inner-most layer of one of the slots 25 and the electrical conductor 231b received in the outer-most layer of another one of the slots 25 that is circumferentially spaced one pole pitch (N-S pole pitch) away from the one of the slots 25 in the clockwise direction of the stator core 22 are electrically connected via the turn portion 23h (231c) of the turn-side end portion 23b on the first axial end side of the stator core 22. Similarly, the electrical conductor 232a received in the inner-middle layer of one of the slots 25 and the electrical conductor 232b received in the outer-middle layer of another one of the slots 25 that is circumferentially spaced one pole pitch (N-S pole pitch) away from the one of the slots 25 in the clockwise direction of the stator core 22 are electrically connected via the turn portion 23h (232c) of the turn-side end portion 23b on the first axial end side of the stator core 22.

That is, the turn-side end portion 23b integrated with the electrical conductor 231a received in the inner-most layer of one of the slots 25 and the turn-side end portion 23b integrated with the electrical conductor 232a received in the inner-middle layer of the same slot 25 both project from the slot 25 in the clockwise direction of the stator core 22 on the first axial end side of the stator core 22. The turn-side end portion 23b integrated with the electrical conductor 231b received in the outer-most layer of another one of the slots 25 that is circumferentially spaced one pole pitch (N-S pole pitch) away from the one of the slots 25 and the turn-side end portion 23b integrated with the electrical conductor 232b received in the outer-middle layer of the same slot 25 both project from the slot 25 in the counterclockwise direction of the stator core 22 on the first axial end side of the stator core 22.

In addition, the electrical conductor 232a received in the inner-middle layer of one of the slots 25 is also paired with the electrical conductor 231a' received in the inner-most layer of another one of the slots 25 that is circumferentially spaced one pole pitch (N-S pole pitch) away from the one of the slots 25 in the clockwise direction of the stator core 22. Similarly, the electrical conductor 231b' received in the outer-most layer of one of the slots 25 is also paired with the electrical conductor 232b received in the outer-middle layer of another one of the slots 25 that is circumferentially spaced one pole pitch (N-S pole pitch) away from the one of the slots 25 in the clockwise direction of the stator core 22.

Such a pair of electrical conductors are electrically connected via their respective junction-side end portions 23c on the second axial end side of the stator core 22. More specifically, as shown in FIG. 10, the electrical conductor 232a received in the inner-middle layer of one of the slots 25 and the electrical conductor 231a' received in the inner-most layer of another one of the slots 25 that is circumferentially spaced one pole pitch (N-S pole pitch) away from the one of the slots 25 in the clockwise direction of the stator core 22 are electrically connected by joining their respective junction end portions 23f (232d and 231d'). Similarly, as shown in FIG. 10, the electrical conductor 231b' received in the outer-most layer of one of the slots 25 and the electrical conductor 232b received in the outer-middle layer of another one of the slots 25 that is circumferentially spaced one pole pitch (N-S pole pitch) away from the one of the slots 25 in the clockwise direction of the stator core 22 are electrically connected by joining their respective junction end portions 23f (231e' and 232e).

That is, the junction-side end portion 23c integrated with the electrical conductor 231a received in the inner-most layer of one of the slots 25 and the junction-side end portion 23c integrated with the electrical conductor 232b received in the outer-middle layer of another one of the slots 25 that is circumferentially spaced one pole pitch (N-S pole pitch) away from the one of the slots 25 both project from the slots 25 in the counterclockwise direction of the stator core 22 on the second axial end side of the stator core 22. The junction-side end portion 23c integrated with the electrical conductor 232a received in the inner-middle layer of one of the slots 25 and the junction-side end portion 23c integrated with the electrical conductor 231b received in the outer-most layer of another one of the slots 25 that is circumferentially spaced one pole pitch (N-S pole pitch) away from the one of the slots 25 both project from the slots 25 in the clockwise direction of the stator core 22 on the second axial end side of the stator core 22.

Further, as shown in FIG. 13, the electrical conductor 231a received in the inner-most layer of one of the slots 25 and the electrical conductor 231b received in the outer-most layer of another one of the slots 25 that is circumferentially spaced one pole pitch (N-S pole pitch) away from the one of the slots 25 are parts of a larger U-shaped conductor segment 231. The electrical conductor 232a received in the inner-middle layer of one of the slots 25 and the electrical conductor 232b received in the outer-middle layer of another one of the slots 25 that is circumferentially spaced one pole pitch (N-S pole pitch) away from the one of the slots 25 are parts of a smaller U-shaped conductor segment 232. The larger U-shaped segment 231 and the smaller U-shaped segment 232 are two types of basic U-shaped conductor segments.

The stator winding 21 includes the multi-phase windings, in each of which the insertion and connection pattern set forth above for the basic conductor segments 23 is repeated over the slots 25 around the stator core 22. For each of the multi-phase windings, the number of coil turns around the stator core 22 is two. The stator winding 21 further includes, for each phase, deformed conductor segments (not shown, but different in shape from the basic segments) including a conductor segment integrated with a lead out from an output, a conductor segment integrated with a lead out from a neutral point, and a conductor segment having a turn portion that provides connection between the first and second turn portions. Such deformed conductor segments allow winding ends of the respective multi-phase windings to be star connected.

As above, ends of the predetermined angled portions 23e of different conductor segments 23 are joined (e.g., welded) on the second axial end side of the stator core 22 in accordance with a predetermined electrical connection pattern. This can provide the three-phase stator winding 21 wound in the slots 25 of the stator core 22. Thereafter, for each slot 25, the plurality of electrical conductors inserted in the slot 25 (slot-received portions 23a of the respective conductor segments 23) and an insulating sheet member 24 are secured to the stator core 22 by varnish (adhesive material) dripped down into the slot 25.

In the stator 2 configured as above, each conductor segment 23 includes the conductor 23j and the bilayer insulative coating 23k formed of the insulating layer 231k and the protective layer 232k configured such that the Young's modulus of the protective layer 232k of the insulative coating 23k of the conductor segment 23 is set greater than that of the insulating layer 231k at room temperature. With this configuration, even when the conductor segment 23 is in contact with corners where the axial end face of the stator core 22 from which the open end portions axially project and inner walls of the slots 25 through which the straight portions 23g, 23g of the conductor segment are inserted meet while bending the open end portions of the straight portions 23g, 23g of the conductor segment in room temperature environments, the corners can be prevented from biting into the insulating layer 231k while the corners are allowed to bite into the protective layer 232k having the Young's modulus greater than the insulating layer 231k. This can prevent the insulating layer 231k from being damaged and collapsed, thereby preventing the insulation failure.

The Young's modulus of the protective layer 232k of the insulative coating 23k is further set less than that of the insulating layer 231k of the insulative coating 23k in high temperature environments caused by heat generation of the stator winding 21 through energization thereof. With this configuration, under stress exerted on the insulative coating 23k during thermal expansion of the insulative coating 23k and the conductor 23j within each slot 25 in the high temperature environments such that the insulative coating 23k is compressed between the conductor 23j and the stator core 22 within the slot 25 and at least one dimension (e.g., thickness) of the insulative coating 23k is thus reduced by a predetermined dimension reduction through sizing deformation, the protective layer 232k collapses, thereby releasing the stress exerted on the insulative coating 23k. This can prevent damage to or collapse of the insulating layer 231k, thereby preventing the insulation failure.

In addition, in the present embodiment, the thickness of the protective layer 232k of each conductor segment 23 is set greater than a thickness reduction of the insulative coating 23k as open end portions of the conductor segment 23 axially projecting from the slots 25 are bent in opposite circumferential directions to form angled portions 23e. This can reliably prevent insulation failure of the stator winding 21 that may occur when the insulating layer 231k is broken during bending of the open end portions of conductor segment 23. In addition, the thickness of the protective layer 232k is set greater than a thickness reduction of the insulative coating 23k of each slot received portion 23a of the conductor segment 23 within the slot 25 in high temperature environments. This can prevent damage to or collapse of the insulating layer 231k, thereby preventing the insulation failure.

The stator 2 for the rotating electric machine of the present embodiment can prevent insulation failure of the stator winding 21 during bending of the open end portions of each conductor segment 23 or in high temperature environments, thereby ensuring good insulating properties.

Other Embodiments

The foregoing disclosure and description of the invention is illustrative and explanatory thereof. Various changes in the details of the illustrated construction can be made within the scope of the appended claims without departing from the true spirit of the invention.

In the first embodiment, the conductor segments 23 forming the stator winding 21 are U-shaped. Alternatively, the conductor segments 23 forming the stator winding 21 may be I-shaped, where angled portions 23e are formed by bending both axial end portions of each of the conductor segments 23. This can more effectively prevent insulation failure of the stator winding 21, thereby ensuring good insulating properties.

In the first embodiment, the stator for the rotating electric machine of the present invention is applied to the vehicle alternator. Alternatively, the rotating electric machine mounted in the vehicle may be a generator, an electrical motor, or a rotating electric machine that can be selectively used as either one of the generator and the electrical motor.

What is claimed is:
1. A stator for a rotating electric machine, comprising:
an annular stator core having a plurality of slots circumferentially arranged in the stator core; and
a stator winding wound around the stator core, the stator winding comprising a plurality of conductor segments including axially extending slot-received portions within the slots and externally exposed coil end portions from the slots, wherein each of the plurality of conductor segments comprises a conductor and a bilayer insulative coating comprised of an insulating layer covering a peripheral surface of the conductor and a protective layer covering a peripheral surface of the insulating layer, the protective layer being formed of a material having a Young's modulus that is equal to or greater than a Young's modulus of the insulating layer at room temperature and less than the Young's modulus of the insulating layer in high temperature environments caused by heat generation of the stator winding when energized.

2. The stator of claim 1, further comprising an insulating sheet member received by each slot for electrically isolating the stator winding from the stator core.

3. The stator of claim 1, wherein the slot-received portions within the slots are secured to the stator core by an adhesive material.

4. The stator of claim 1, wherein
the insulating layer is formed of enamel, and
the protective layer is formed of polyether ether ketone (PEEK).

5. The stator of claim 1, wherein the conductor has a rectangular cross section.

* * * * *